United States Patent
Suffel et al.

(10) Patent No.: US 11,413,116 B2
(45) Date of Patent: Aug. 16, 2022

(54) TWO-COMPONENT MIXING CAPSULE, IN PARTICULAR FOR DENTAL PURPOSES

(71) Applicant: KULZER GMBH, Hanau (DE)

(72) Inventors: Ralf Suffel, Schwerte (DE); Andreas Utterodt, Neu-Anspach (DE); Michael Eck, Schmitten (DE); Raif Kocoglu, Grävenwiesbach (DE); Markus Balkenhol, Neuberg (DE)

(73) Assignee: KULZER GMBH, Hanau (DE)

( * ) Notice: Subject to any disclaimer, the term of this patent is extended or adjusted under 35 U.S.C. 154(b) by 844 days.

(21) Appl. No.: 16/060,447

(22) PCT Filed: Dec. 8, 2016

(86) PCT No.: PCT/EP2016/080162
§ 371 (c)(1),
(2) Date: Jun. 8, 2018

(87) PCT Pub. No.: WO2017/097868
PCT Pub. Date: Jun. 15, 2017

(65) Prior Publication Data
US 2018/0368939 A1      Dec. 27, 2018

(30) Foreign Application Priority Data
Dec. 9, 2015   (DE) .................. 10 2015 121 453.9

(51) Int. Cl.
*A61C 5/64*      (2017.01)
*A61C 5/66*      (2017.01)

(52) U.S. Cl.
CPC . *A61C 5/64* (2017.02); *A61C 5/66* (2017.02)

(58) Field of Classification Search
CPC .......... A61C 5/64; A61C 5/66; A61M 5/2448; A61M 5/284; A61M 5/31596;
(Continued)

(56) References Cited

U.S. PATENT DOCUMENTS

| | | | |
|---|---|---|---|
| 3,889,674 A * | 6/1975 | Cilento | A61M 5/31596 604/518 |
| 4,175,658 A | 11/1979 | Moser et al. | |

(Continued)

OTHER PUBLICATIONS

International Search Report dated Mar. 1, 2017, dated Mar. 10, 2017.
(Continued)

*Primary Examiner* — Heidi M Eide
*Assistant Examiner* — Drew S Folgmann
(74) *Attorney, Agent, or Firm* — Norris McLaughlin, P.A.

(57) ABSTRACT

The invention relates to a two-component mixing capsule (1) for intake and for mixing of two, preferably powdered or preferably pasty or kneadable, particularly preferably dental, compositions with a capsule housing (2) having a discharge opening (3) at its front end (2.1), wherein the mixing capsule (1) comprises a first mixing chamber (5a) and a second mixing chamber (5b), wherein the two mixing chambers may be separated from each other for storage or for transport, by the first mixing chamber (5a) being rotated by a rotatably mounted handhold element whose rotation axis (Y) is approximately perpendicularly arranged to the longitudinal axis (Z) of the mixing capsule (1) into a first position in which the first mixing chamber (5a) is separated from mixing chamber (5b), preferably the central axes of the mixing chambers are arranged to each other by approximately 90°. By rotating the first mixing chamber (5a) into a second position in which the central axes of the first and second mixing chamber are substantially coaxially arranged, the two mixing chambers form a common mixing chamber (5a+5b), wherein the composition may be discharged after mixing by attaching a squeezing piston.

15 Claims, 5 Drawing Sheets

Figure 4B:
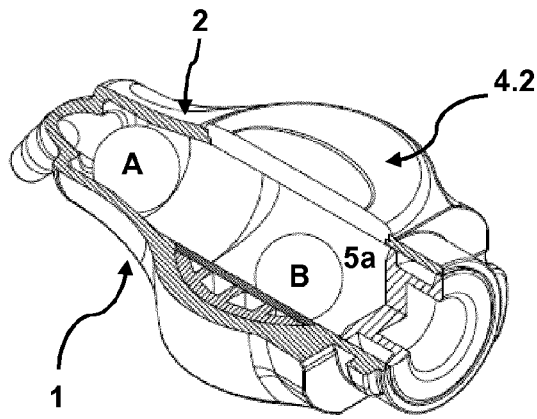

(58) Field of Classification Search
CPC ........ A61M 5/3294; A61M 2039/0027; A61M 5/2066; A61J 1/2031; A61J 1/2058; A61J 1/2065
See application file for complete search history.

(56) References Cited

U.S. PATENT DOCUMENTS

| | | | |
|---|---|---|---|
| 5,599,312 A * | 2/1997 | Higashikawa | A61M 5/3129 604/191 |
| 6,387,074 B1 * | 5/2002 | Horppu | A61M 5/2066 604/89 |
| 2004/0134222 A1 | 7/2004 | Holley | |
| 2011/0017777 A1 * | 1/2011 | Nakatsuka | B65D 81/3211 222/145.5 |

OTHER PUBLICATIONS

English Translation of International Search Report dated Mar. 1, 2017, dated Mar. 10, 2017.

\* cited by examiner

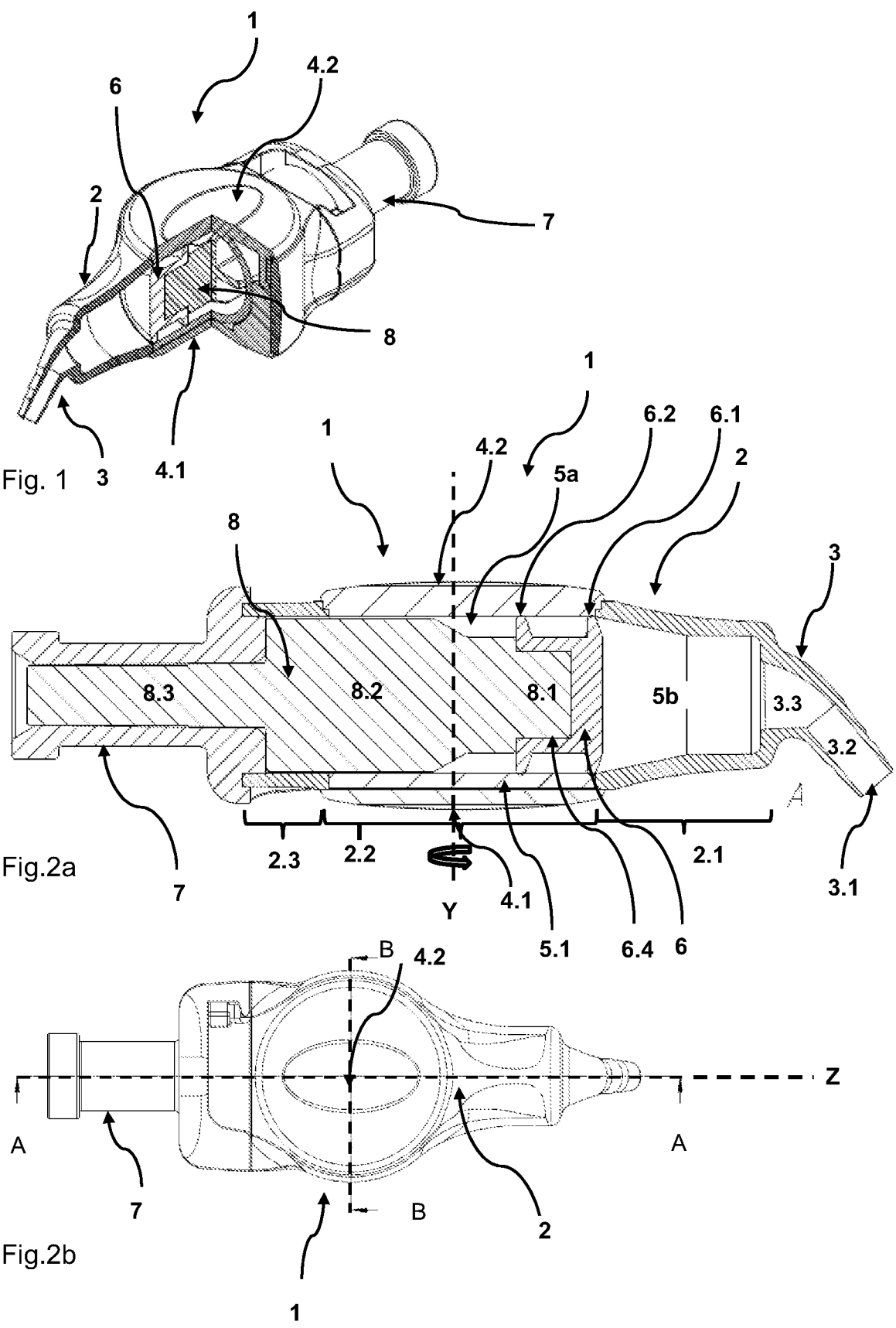

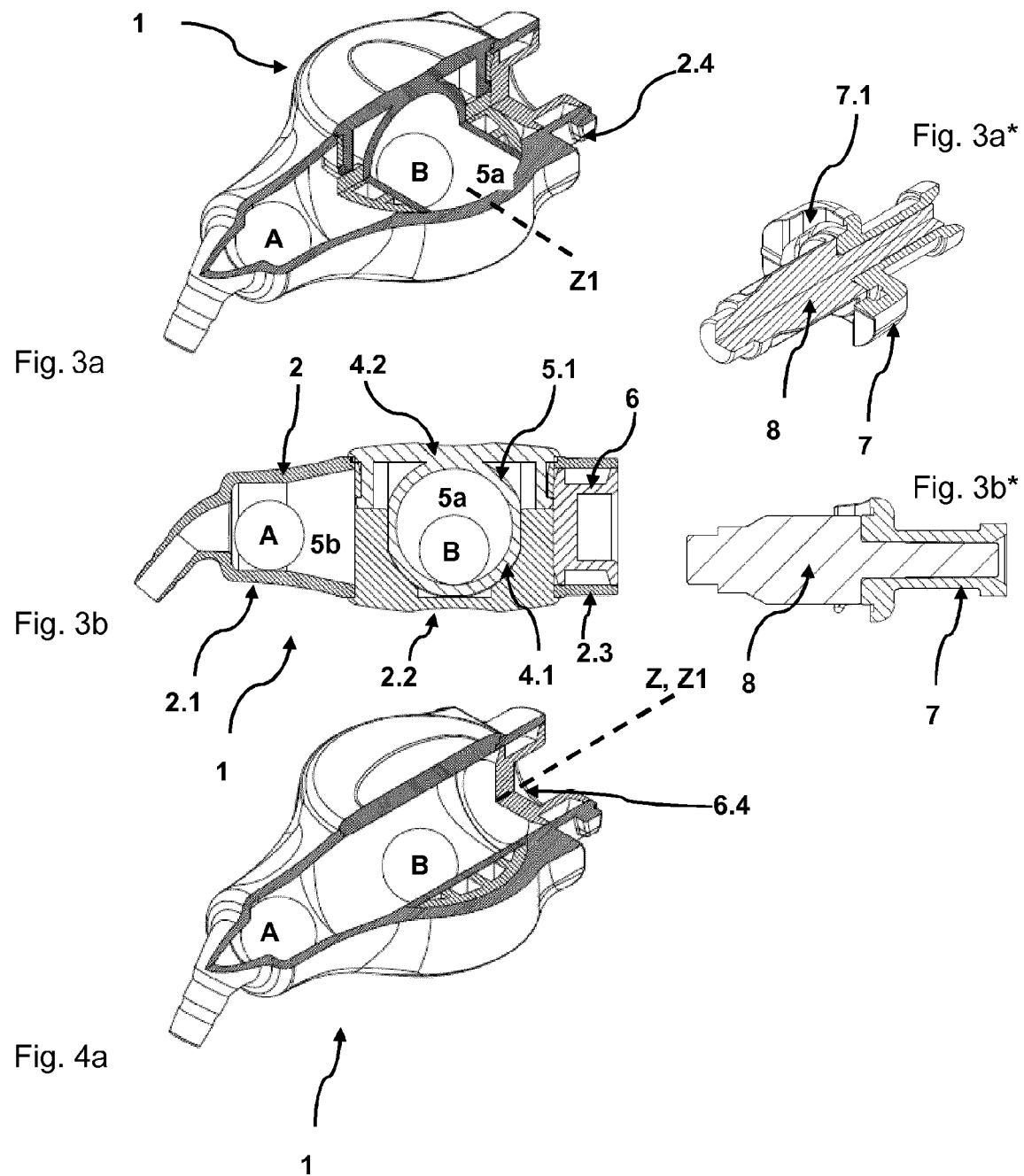

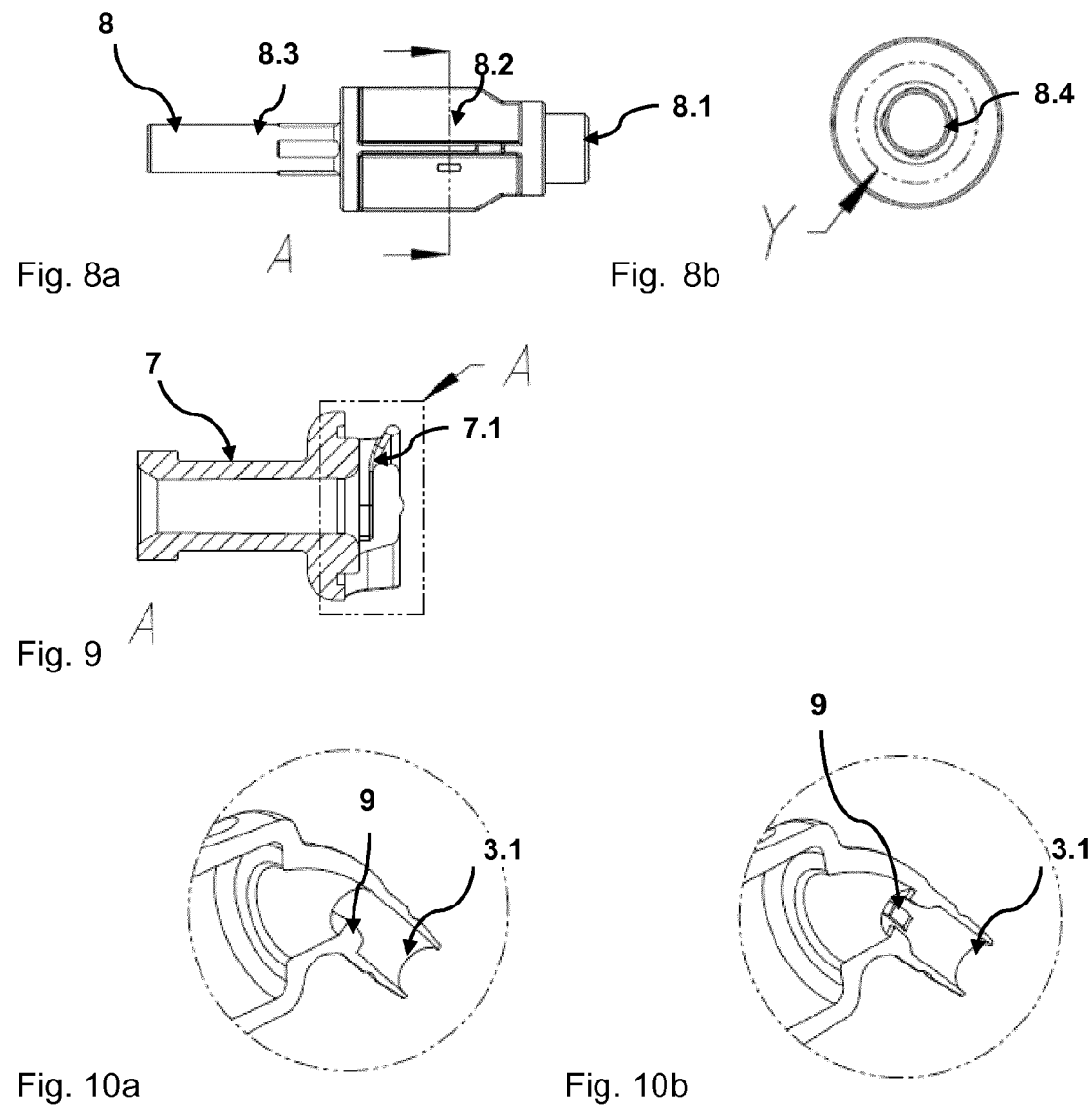

TWO-COMPONENT MIXING CAPSULE, IN PARTICULAR FOR DENTAL PURPOSES

This application is a 371 of International Patent Application No. PCT/EP2016/080162, filed Dec. 8, 2016, which claims foreign priority benefit under 35 U.S.C. § 119 of the German Patent Application No. 10 2015 121 453.9, filed Dec. 9, 2015, the disclosures of which are incorporated herein by reference.

The invention relates to a two-component mixing capsule for intake and for mixing of two, preferably powdered or preferably pasty or kneadable, particularly preferably dental, compositions with a capsule housing having a discharge opening at its front end, wherein the mixing capsule comprises a first mixing chamber and a second mixing chamber, wherein the two mixing chambers may be separated from each other for storage or for transport, by the first mixing chamber being rotated by a rotatably mounted handhold element whose rotational axis (Y) is approximately perpendicularly arranged to the longitudinal axis (Z) of the mixing capsule (1), preferably of the second mixing chamber, into a first position in which the first mixing chamber is separated from mixing chamber, preferably the central axes of the mixing chambers are arranged to each other by approximately 90°. By rotating the first mixing chamber into a second position in which the central axes of the first and second mixing chamber are substantially coaxially arranged, the two mixing chambers form a common mixing chamber, wherein the composition may be discharged after mixing by attaching a squeezing piston.

Another subject matter of the invention is a method as well as the use of the mixing capsule according to the invention for mixing and applying of two-component compositions, preferably of dental 2K-compositions.

The state of the art discloses a variety of mixing capsules in dental field being suitable for storing and mixing two-component compositions. Usually, characteristic of mixing capsules in dental filed is their small length of approximately 32 mm, in order to allow insertion of the mixing capsule into the holing fork of known mixing devices. The mixing capsules according to the state of the art usually have two chambers separated by a film having a predetermined breaking point, each comprising one of the two components of the two-component composition, wherein a piston punctures this film prior to mixing. After mixing, a tool may be inserted into the mixing capsule that displaces a discharge piston in the mixing capsule and thus may discharge the mixed composition from the mixing capsule.

A disadvantage of the known mixing capsules is that they are usually designed for mixing a liquid monomer component with a powdered component. The state of the art discloses almost no economically producible or easy-to-use mixing capsules being able to mix two pasty to kneadable 2K-compositions with each other. Further, various locking mechanisms preventing inadvertent puncture of the film must be provided on the capsules of the state of the art.

It was the object of the invention to develop a mixing capsule allowing storage and mixing of pasty to kneadable, and optionally with powdered or preferably pasty to solid and at the same time thixotropic multiple-component compositions, wherein pasty with powdered components may also be mixed where appropriate. Further, the object was to dimension the mixing capsule so that it is insertable into usual mixing apparatuses, as they are used in dental surgeries.

The objects were solved by a mixing capsule according to claim 1 as well as a method according to claim 13 and the use according to claim 16.

A subject matter of the invention is a multi- or two-component (2K) mixing capsule for intake, in particular storage, and for mixing of at least two, in particular pasty, kneadable to solid, preferably thixotropic and preferably dental, compositions with a capsule housing having a discharge opening at its front end, such as a discharge opening right at the housing or, in particular, at an integral or attached discharge nozzle, wherein the mixing capsule comprises a lower handhold element rotatably mounted in the capsule housing and an upper handhold element rotatably mounted in the capsule housing, wherein preferably the rotational axis (Y) of at least one of the handhold elements is approximately perpendicularly arranged to the longitudinal axis (Z) of the mixing capsule, and wherein a rotatably mounted first mixing chamber is assigned to at least one of the two handhold elements, and a second mixing chamber is preferably arranged in the capsule housing. Preferably, the respective rotational axis of the handhold element, each independently from one another, is approximately perpendicularly arranged to the longitudinal axis of the mixing capsule, preferably the rotational axes are substantially coaxially arranged to each other. In this context, a rotatably mounted first mixing chamber may be assigned to at least one of the two handhold elements, wherein the mixing chamber, preferably being present as pipe section or one side closed sleeve, forms an integral component with at least one handhold element or, alternatively, the separated mixing chamber is form-locked fixed with one or both handhold elements. The respective rotational axes of the handhold elements, preferably being coaxially arranged to each other, are approximately perpendicularly arranged to the longitudinal axis of the mixing capsule, preferably the two handhold elements are rotatable only in common about a common rotational axis being approximately perpendicularly arranged to the longitudinal axis of the mixing capsule. In this context, it is further preferred for a first mixing chamber, preferably being present as pipe section or one side closed sleeve, to be assigned to at least one of the handhold elements and to form an integral component with at least one handhold element. Alternatively, the first mixing chamber may be a separated component being form-locked fixed to one or both handhold elements. Like this, for example, the mixing chamber may caught with at least one handhold element, in particular in a clip.

The two pasty, kneadable to solid, preferably thixotropic and preferably dental, composition, are preferably present separately in the first and second mixing chamber as single pasty to kneadable composition, in particular preferably as one-piece composition. Alternatively, the composition may be present in the form of several components, in particular one component has at least 1.5 mm in one dimension. The composition is preferably not powdered.

A wall-like ridge or differently shaped ridge may be formed at the handhold elements as additional handhold for easier rotating. The mixing capsule according to the invention with capsule housing and without guiding adapter and without squeezing piston preferably has a length of less than or equal to 10 cm, preferably less than or equal to 8 cm, particularly preferably a length of less than or equal to 5 cm or less than or equal to 2.5 cm. The total mixing chamber of the mixing capsule preferably has a length of 2.0 to 4.0 cm, in particular of 2.5 to 3.0 cm with a diameter of 0.5 to 2.0 cm, in particular of 0.8 to 1.2 cm. The volume of the total mixing chamber is approximately from 20 to 200 mm$^3$, in particular from 50 mm$^3$ to 135 mm$^3$. The mixing capsule according to the invention is formed such that it may be inserted into usual PLT discharge devices or PLT applicators, respectively.

The rotatably mounted mixing chamber may be arranged within a pipe section or in a one side closed pipe section as one side closed sleeve. Preferably, the first mixing chamber is arranged in a pipe section being integrally connected with a rotatably mounted handhold element. The first or the second mixing chamber are to be understood as being parts of the producible total mixing chamber and may form the total mixing chamber, in which the mixing is preferably made.

According to a preferred embodiment, the two handhold elements rotatably mounted in the capsule housing are connected with each other, preferably detachably or even permanently connected. They may be welded by means of ultrasonic, glued, and/or caught with the capsule housing or pieced together. Alternatively, one or both handhold elements are rotatably connected with the capsule housing. According to the invention, a rotatable handhold element or rotatable mixing chamber, pipe section or sleeve is to be understood to mean that the aforementioned components are rotatable by at least 30°, preferably at least by 90°, about a rotational axis being approximately perpendicular to the longitudinal axis of the capsule housing or perpendicular to the longitudinal axis of the second mixing chamber, respectively, preferably the components are rotatable by at least 360°. If the components are rotatable by 360°, it may be preferred to attach markings, showing the position of the first mixing capsule, to one or both handhold elements, in particular in relation to the second mixing chamber. Preferably, the handhold elements and/or the mixing chambers have cams so that the user feels when he has set the exact coaxial position of the mixing chambers.

Further, it is preferred for the first mixing chamber to be arranged at the lower handhold element rotatably mounted in the capsule housing and/or the upper handhold element rotatably mounted in the capsule housing, in particular one rotatably mounted handhold element and the first mixing chamber form a one-piece component, in particular an integral component. Preferably, the mixing capsule may be present in the form of a pipe section or, in an alternative, as one side closed pipe section, e.g. as cylindrical one side closed sleeve, wherein it is preferably present as integral component with a handhold element. The pipe section may be formed cylindrically, circularly, as well as polygonally, such as hexagonally.

According to two alternatively preferred embodiments, the mixing capsule has a pipe section connected to a rotably mounted handhold element, or a cylindrical one side closed sleeve forming the first mixing chamber, wherein either a) the second mixing chamber is located in the front region in the capsule housing or b) the second mixing chamber is located in the back region in the capsule housing. In this context, it is preferred for the pipe section or the sleeve to form an integral component with the handhold element. Alternatively, the mixing chamber being present as separated component may be form-locked fixed with one or both handhold elements.

The mixing capsule according to the invention may be transferred into different positions for storage, mixing or applying. The rotably handhold of the mixing capsule according to the invention can be connected with the pipe section and forms the first mixing chamber, in particular the rotatably mounted handhold element is integrally connected with the pipe section, and the second mixing chamber is located in the front region in the capsule housing, wherein the mixing capsule a) is in a first position, e.g. for storage or for transport, if the longitudinal axis (Z1) of the pipe section is preferably twisted by approximately 90° to the longitudinal axis (Z) of the capsule housing such that the first mixing chamber, in particular comprising composition B, and the second mixing chamber, in particular comprising composition A, are separated from each other, or wherein the mixing capsule b) is in a second position, e.g. "mixing position mixing" if the longitudinal axis (Z1) of the pipe section is preferably substantially coaxial to the longitudinal axis (Z) of the capsule housing such that the first mixing chamber and the second mixing chamber form a common mixing chamber, in particular comprising compositions A and B, alternatively the mixing capsule is in the second position if the pipe section or the one side closed sleeve comprising the first mixing chamber are twisted such that the first and the second mixing chamber form a common mixing chamber, and, wherein the mixing capsule in b) of the second position is also in a discharge position c) if the guiding adapter with movable squeezing piston is arranged at the back end of the capsule housing, wherein the movable squeezing piston may displace the sealing piston through the first mixing chamber and the second mixing chamber in the direction toward the front end of the capsule housing on in the direction towards the back region in the discharge nozzle. The sealing piston may preferably be pushed by the squeezing piston in the capsule housing in the direction toward the discharge opening such that the mixed composition C may be pushed by the sealing piston in the direction toward the discharge opening and pressed out from the discharge opening.

The mixing chambers are to be understood as separated if they are spatially separated from each other and compositions A and B may not interact with each other.

Preferably, at least one handhold element has at least one locking means, such as a cam, and optionally the capsule housing of the mixing capsule has at least one locking means, such as a recess, which are preferably interlock as positive and negative in the second position of the mixing capsule, in which a common mixing chamber is formed from the first mixing chamber and the second mixing chamber. Thus, the position in which the first mixing chamber and the second mixing chamber form a common mixing chamber is fixed by the locking means. For example, the locking means may be at least one cam and a corresponding recess that interlock. Likewise, the at least one cam may be formed at the mixing capsule or the at least one recess at at least one handhold element. The locking means, such as cam(s), and the corresponding recess(es) for engaging of the cams, preferably at least two recesses arranged in an angle of approximately 90°, allow setting of a transport and storage position of the first mixing chamber approximately perpendicular to the longitudinal axis of the mixing capsule, which corresponds to the first position, and a mixing and/or discharge position, in which the longitudinal axis of the first mixing chamber is coaxially locked to the longitudinal axis of the mixing capsule, which corresponds to the second position.

A guiding adapter is attachable at the mixing capsule of the invention at its back of the housing, in which a movable squeezing piston is arranged. The squeezing piston movable in the guiding adapter, preferably locked, may be moved in the guiding adapter by applying a certain force such that the locking is disengaged. The locking may consist of at least one ridge on the outer periphery of the squeezing piston fitting on the inside of the guiding adapter, in particular in a form-locked or force-locked fitting manner.

Preferably, the guiding adapter with movable squeezing piston may be fixed to the back end of the capsule housing by means of a bayonet catch, a screw or clip connection or another measure known by the person skilled in the art. In this context, it may be preferred for the squeezing piston to be inserted into the recess of the sealing piston after fastening the guiding adapter, and the sealing piston may be slid into the capsule housing to subsequently fasten the guiding adapter to the back end of the capsule housing. According to the invention, the sealing piston is displaced into the capsule housing in the direction toward the discharge opening by attaching the guiding adapter with squeezing piston. In this position, the mixing capsule may be inserted in usual applicators for PLT (compules). The stroke in the mixing capsule considering the maximum travel of usual applicators could be increased bay displacing the sealing piston during attaching the guiding adapter.

Another subject matter of the invention is a mixing capsule with capsule housing, wherein a sealing piston is arranged in the capsule housing at its back end which, in particular, seals the mixing capsule at its back end, preferably seals air-tightly and/or moisture-tightly. In this context it is preferred for the sealing piston to be passable through the first mixing chamber or the hollow pipe section and a second mixing chamber along the longitudinal axis (Z) of the mixing capsule, preferably through the common mixing chamber, if the mixing chamber or the pipe section is substantially coaxially oriented to the longitudinal axis (Z) of the mixing capsule, wherein preferably the first and the second mixing chamber form a common mixing chamber. Preferably, the sealing piston is on the inside of the back end of the housing. Preferably, the sealing piston is arranged displaceably along the longitudinal axis of the mixing capsule, and seals the mixing capsule at its back end, preferably air-tightly and/or moisture-tightly.

Preferably, the second mixing chamber is formed by a region in the front central region of the capsule housing. Alternatively, the second mixing chamber may also be arranged in the back region of the capsule housing. The first mixing chamber is in the rotatably mounted pipe section or the rotatably mounted one side closed sleeve having a bottom, wherein the bottom of the one side closed sleeve is detachable from the sleeve by the sealing piston to be able to push the sealing piston through the sleeve. Provided that the first mixing chamber is in a rotatably mounted pipe section, in particular a hollow pipe section, the sealing piston may be pushed in the second position through the pipe section and optionally the second mixing chamber, if the axis of the first mixing chamber, in particular of the hollow pipe section, is coaxially oriented to the longitudinal axis of the mixing capsule.

Another subject matter of the invention is a mixing capsule, in which the movable sealing piston, in an alternative, is reducible in its diameter, in particular diameter (D1) of the sealing piston is substantially reducible to diameter (D2). For this purpose, the sealing piston preferably carries lamellae at its outer periphery. In a further alternative, the sealing piston may have a fixed diameter. Preferably, the sealing piston according to the invention has a recess at its side averting the mixing chamber, in which the front region of the squeezing piston is insertable. Further, the sealing piston preferably has at least one, preferably radially protruding, lamella at its outer periphery. According to a preferred alternative, the sealing piston has two to a multitude of lamellae at the outer periphery. Preferably, the lamellae may be made of an elastic material, e-g- TPE (thermoplastic elastomer) or be elastic due to their geometry. The lamellae preferably form an integral component with the sealing piston. Further, the lamellae may be formed with a phase on one side at the outer periphery or on both sides. The lamellae may be produced from the same material as the sealing piston, or from a silicone or another suitable material also.

The sealing piston preferably has at least in in part a defined surface roughness on the side facing the mixing chamber. Preferably, the side facing the mixing chamber has an area of a defined size, preferably a circular area having surface roughness. The surface roughness may be produced by means of eroding, material ablative processes, such as sand blasting, etching or also material generative processes etc. The surface roughness preferably amounts to a roughness (average roughness) Ra of 3.5 µm (micrometers) to 30 µm, preferably of 6 µm to 24 µm. preferably of 8 µm to 20 µm, particularly preferably of 10 to 20 µm, alternatively about 10 µm with +/−2.5 µm. Alternatively, the roughness of the erosion structure may have the identifier 30, 33, 36, 39 or 42 according to VDI 12 3400. Likewise, the capsule housing or the pipe section may be provided, where necessary, at least in part to completely with a defined surface roughness.

Further, the mixing capsule has a) the discharge opening at its housing. The discharge opening is preferably formed in a discharge nozzle as integral part of the capsule housing. Alternatively, a discharge opening b) may be arranged in a discharge nozzle being fixable to the capsule housing. Preferably, the discharge nozzle is curved and has a form as known mixing capsules or carpules, respectively, like this, for example, it has a form allowing discharging of the dental material into a tooth cavity.

According to a further alternative, it is preferred for at least one resistance means to be equipped with inside the discharge nozzle in the front or back region in front of the outlet, preferably the resistance means is designed such that it may drive a change of the viscosity of the composition to be discharged and/or additional mixing of the composition to be discharged. In preferred embodiments, the resistance means is a wall not extending over the whole diameter, or at least one nose.

The material from which the individual parts of the mixing capsule, such as the capsule housing, the discharge nozzle, the handhold elements, the pipe section, the sleeve, the sealing piston, the guiding adapter, the squeezing piston and/or the resistance means consist of preferably comprises a tribological-modified plastic, such as PBT-POM; polybutylene terephthalate (PBT), polyoxymethylene (POM), PC (polycarbonate), as well as plastics comprising organic and/or inorganic fillers, such as, for example the following additives, such as silicone oil, graphite (GR), fluorocarbon (TF), carbon fibres (CF), $MoS_2$ (MO), polyolefin waxes or other solid lubricants. Likewise suitable materials for production of the aforementioned capsule parts ay be selected from a polymeric material, filled polymeric material, a fiber-reinforced polymer, hybrid material wherein the polymeric material may be selected from polycarbonate, polyamide, fluoropolymers, polysulfide-containing polymers, polysulfone-containing polymers, polyaryletherketones, polyimides, PAEK (polyaryletherketones), PEEK (polyetheretherketones), PEK (polyether-ketones); PEKK (poly(etherketoneketones)), PEEEK (poly(etheretheretherketones)), PEEKK (poly(etheretherketoneketones)), PEKEKK (poly(etherketoneether-ketoneketones); PES (polyarylsulfones), PPSU (polyarylsulfones), PSU (polysulfones), PPS (polyphenylene sulfides), PFA (perfluoroalkoxy polymers), PFE (poly(fluorenylene ethynylene) polymers), PVDF (polyvinylidene fluorides), PCTFE (polytetrafluoroethylenes), PAI (polyamide imides), PI (polyimides), PEI (polyetherimides), PBI (polybenzimidazoles). The squeezing piston preferably is manufactured form polycarbonate. The sealing piston may preferably be manufactured from a TPE (thermoplastic elastomer) having a hardness of 60-100 Shore A, preferably 70-90 Shore A. A preferred TPE may comprise TPE-S, such as SEBS; styrene-ethene butene-styrene-block copolymer.

According to a further embodiment, a subject matter of the invention is a method for mixing at least two composition A and B into a composition C in the mixing capsule according to the invention, in particular of pasty, kneadable to solid, preferably thixotropic composition, particularly preferably of dental composition, comprising the steps of (i) transferring the mixing capsule from a a) first position into a b) second position by the pipe section, in particular from a non-coaxial position of its longitudinal axis to the longitudinal axis of the capsule, preferably a position approximately perpendicularly arranged to the longitudinal axis, being rotated in the direction towards the longitudinal axis (Z) of the capsule housing, in particular being rotated substantially coaxially to the longitudinal axis (Z) of the capsule housing, by rotating at least one handhold element with the pipe section in which the mixing chamber and composition B is located about its rotational axis (X), such that the first mixing chamber comprising composition B and the second mixing chamber in the capsule housing comprising composition A form a common mixing chamber, (ii) mixing compositions A and B with each other, wherein, in particular, the mixing capsule is in the second position b), and (iii) obtaining composition C.

The (iv) discharging of composition C from the mixing capsule is preferably made, with the steps of (iv.1) fixing the guiding adapter with movable squeezing piston at the back end of the capsule housing, and optionally (iv.2) pushing the squeezing piston into the capsule housing of the mixing capsule along with the sealing piston, preferably until the sealing piston is pressed against the front inner wall of the capsule housing, such that the sealing piston is pushed through the common mixing chamber by the squeezing piston.

In the method according to the invention, the mixing capsule preferably is a) in a first position if the longitudinal axis (Z1) of the pipe section is preferably twisted by approximately at least 30° preferably by approximately 90° to the longitudinal axis (Z) of the capsule housing such that the first mixing chamber, in particular comprising composition B, and the second mixing chamber, in particular comprising composition A, are separated from each other, or wherein the mixing capsule b) is in a second position, e.g. a mixing position, if the longitudinal axis of the pipe section is preferably coaxial to the longitudinal axis of the capsule housing such that the first mixing chamber and the second mixing chamber form a common mixing chamber, in particular comprising compositions A and B, or wherein the mixing chamber in position b) is also in a discharge position c) if the guiding adapter with movable squeezing piston is arranged at the back end of the capsule housing, wherein the movable squeezing piston may displace the sealing piston through the common mixing chamber in the direction toward the outlet or the discharge opening, or the sealing piston may be displaced against the front inner wall of the capsule housing. Thereby, composition C is preferably pushed by the sealing piston in the direction toward the discharge opening and may be applied through the discharge opening.

During mixing, the mixing capsule is oscillating moved at least along a part of the longitudinal axis of the mixing capsule or the capsule housing, respectively. Preferably, the mixing capsule is oscillating moved with a part of its longitudinal axis along a circular orbit having a radius.

For mixing composition A and B P, the guiding adapter with movable squeezing piston is preferably is not yet fixed to the back end of the capsule housing.

In an alternative, the pipe section is formed as one side closed sleeve with bottom in which the first mixing chamber and composition B is located, wherein the bottom of the sleeve may be displaced into the sleeve by the sealing piston after mixing, in particular the bottom may be displaced to the front end of the capsule housing. The bottom of the sleeve may be formed like a foil and may comprise predetermined breaking points. According to a preferred embodiment, the first mixing chamber is formed from a both-sided open pipe section.

Another subject matter of the invention is the use of a mixing capsule in which a first mixing chamber is rotatable in a first position for storing of preferably at least two compositions and in a second position for mixing the compositions and applying the mixed composition, by rotating about its rotational axis (Y), wherein the rotational axis (Y) is approximately perpendicularly arranged to the longitudinal central axis (Z) of the capsule housing of the mixing capsule, wherein the first mixing chamber with a second mixing chamber, which may be arranged in the front or back region of the capsule housing, forms a common mixing chamber in the second position. Thereby, the first mixing chamber is preferably swiveled by rotating its longitudinal axis (Z1) about its rotational axis (Y).

Further, a subject matter of the invention is the use of the mixing capsule for storing, mixing and applying (discharging) of pasty to kneadable or solid dental two-component compositions. Preferably, the mixable compositions are thixotropic dental compositions.

The embodiments shown in the following figures show exemplary subject matters according to the invention, without limiting the invention to these subject matters.

The figures show:

FIG. 1: mixing capsule 1 according to the invention (empty) with guiding adapter 7 in sectional view and sealing advanced piston 6.

FIGS. 2a and 2b: as FIG. 1, wherein FIG. 2a is a sectional view and FIG. 2b is a top view.

FIGS. 3a, 3a*, 3b and 3b*: mixing capsule 1 in sectional view in first position (storage position) with compositions A and B—with guiding adapter 7 and squeezing piston 8 not being fixed.

Figure 4C:
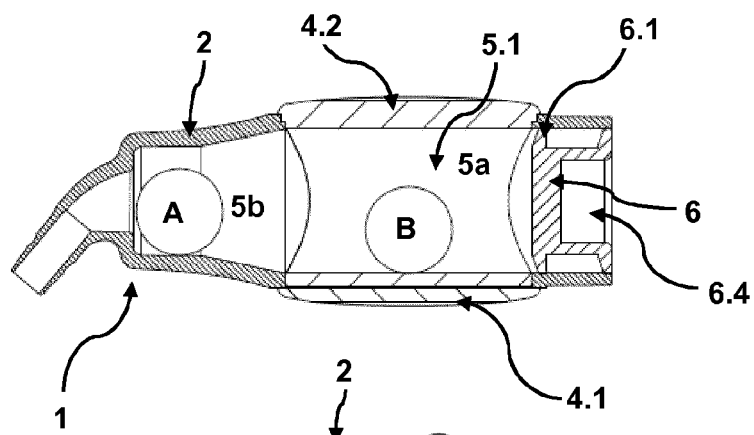

FIGS. 4a, 4b and 4c: sectional view of the mixing capsule 1 in second position with coaxial orientation of the first and second mixing chamber 5a and 5b.

Figure 5A:
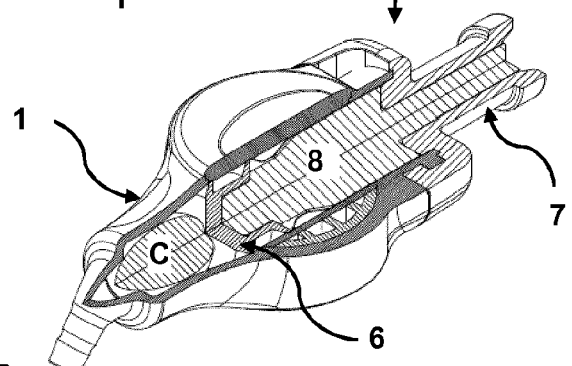
Figure 5B:
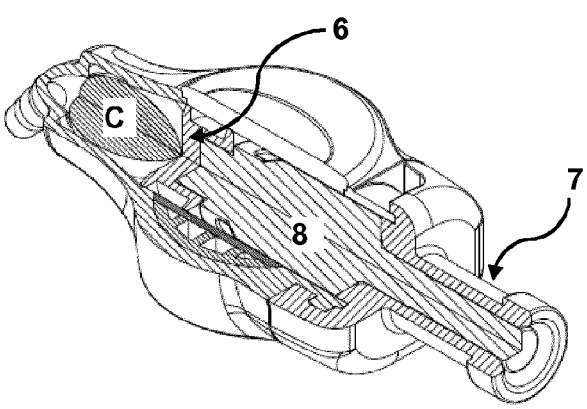
Figure 5C:
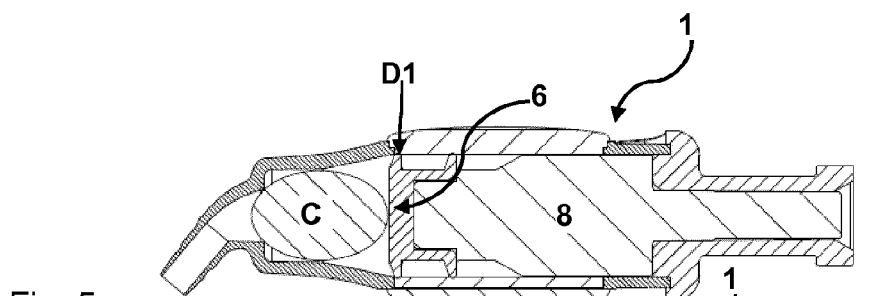

FIGS. 5a, 5b and 5c: mixing capsule 1 with mixed composition C ready for application with attached guiding adapter 7 and squeezing piston 8.

Figure 5D:
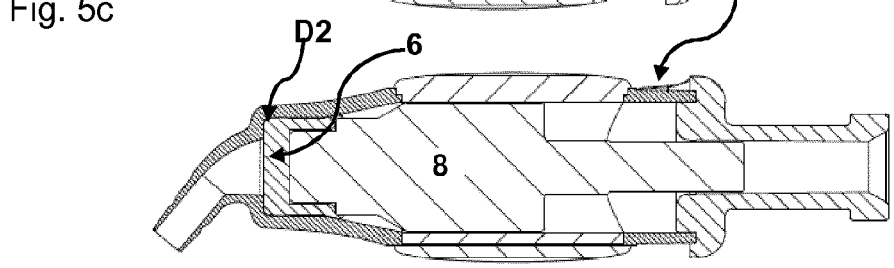
Figure 5E:
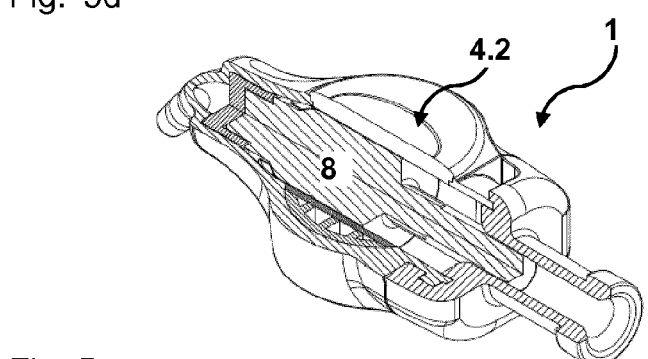

FIGS. 5d and 5e: mixing capsule in position in which application of composition C is already done with completely advanced sealing piston and squeezing piston.

Figures 6A, 6B, 6C:
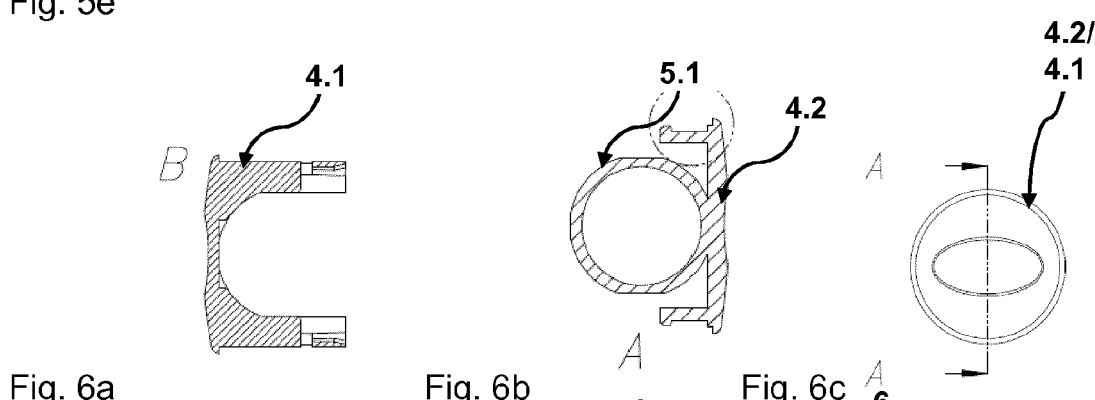

FIGS. 6a, 6b, 6c: handhold elements with pipe section

FIGS. 7a, 7b, 7c and 7d: sealing piston 6

FIGS. 8a, 8b: squeezing piston 8

FIG. 9: guiding adapter 7 with squeezing piston and bayonet catch

FIGS. 10a and 10b: discharge nozzle inside with resistance means 9.

FIG. 1 shows an empty mixing capsule 1 according to the invention with guiding adapter 7 and squeezing piston 8 in sectional view with advanced sealing piston 6. The mixing capsule 1 comprises a capsule housing 2 with a discharge nozzle 3. Further, the rotatably mounted handhold elements 4.1 and 4.2 are shown. FIGS. 2a and 2b show a mixing capsule according to FIG. 1 in cross-section and in top view. In FIG. 2a, the first mixing chamber 5a is coaxially arranged with the second mixing chamber 5b in the mixing capsule 1, such that the sealing piston 6 is shown pushed through the first mixing chamber 5a to the second mixing chamber 5b by the squeezing piston 8 being movably mounted in the guiding adapter 7. In this position, the first and the second mixing chamber form a common mixing chamber. The back 3.3 and the central 3.2 region in the inside of the discharge nozzle as well as the discharge opening 3.1 are shown in the discharge nozzle 3. The handhold elements 4.1 and 4.2 may be rotated about the rotational axis Y, wherein the pipe section 5.1 comprising the first mixing chamber 5a is rotated concurrently. Preferably, at least one handhold element has gills on the outer surface, particularly preferably both hand hold elements have ridges and/or recesses, such as gills, on the outer surface, facilitating swiveling of the handhold elements about the central axis by the user. The longitudinal axis Z of the mixing capsule is indicted in FIG. 2b. The front region 8.1 of the squeezing piston is inserted into the recess 6.4 in the sealing piston 6. The central region 8.2 of the squeezing piston 8 serves for guiding of the piston in the mixing chamber. The back region 8.3 may be further pushed in the direction of the mixing chamber by an external tool. The lamellae 6.1 and 6.2 of the sealing piston 6 are on the inside of the mixing chamber.

FIGS. 3a, 3a* and 3b, 3b* show a mixing capsule 1 in sectional view in the first position (sale/storage position) comprising composition B in the first mixing chamber 5a and composition A in the second mixing chamber 5b. The longitudinal axis Z1 of the first mixing chamber or pipe section, respectively, is approximately perpendicularly shown to the longitudinal axis Z of the capsule or the capsule housing, respectively. A sealing means 2.4 is equipped with at the capsule in the back region, such as e.g. a bayonet cast 2.4. Further, FIGS. 3a and 3b show the guiding adapter 7 with inserted squeezing piston 8. The squeezing piston is caught with the adapter by locking means 8.4 circumferenting at the outer periphery in the upper region of the squeezing piston, such as ridges or cams or noses 8.4, respectively. FIG. 3b shows a pipe section 5.1 with first mixing chamber 5a, whose longitudinal axis Z1 is rotated to the longitudinal axis Z of the capsule by 90°. Composition A is shown in the second mixing chamber 5b. In FIGS. 4a, 4b and 4c, the second position of the mixing capsule 1 is shown in which the first mixing chamber 5a and the second mixing chamber 5b are coaxially arranged to each other. In the second position, compositions A and B may be mixed with each other in the total mixing chamber formed 5a and 5b. In this embodiment, the pipe section 5a with the handhold elements 4.2 form an integral component. The handhold elements 4.1 and 4.2 are rotatably caught with the capsule housing 2 and/or with themselves. Preferably, the handhold elements 4.1 and 4.2 are caught with themselves and are rotatably mounted in the capsule housing 2 in common. The front circumferential lamella 6.1 of the sealing piston 6 is shown in FIG. 4c.

In FIGS. 5a, 5b, 5c, 5d and 5e, the mixing capsule 1 with mixed composition C is shown in a section view. The squeezing piston 8 is inserted into the recess 6.4 of the sealing piston 6 and pushed through the first mixing chamber 5a to the second mixing chamber 5b. Composition C may now be applied from the mixing capsule 1 by further driving the squeezing piston 8 as well as the sealing piton 6. In this position, the sealing piston is still present with a diameter D1 with protruding lamellae, as shown in FIG. 5c. Upon further advancement of the sealing piston, the lamellae attach to the outside of the sealing piston 6 and diameter of the sealing piston decreases to diameter D2, as shown in FIGS. 5d and 5e.

FIGS. 6a, 6b, 6c show the handhold elements 4.1 and 4.2. Handhold element 4.2 comprises the pipe section 5.1 forming the first mixing chamber 5a. Preferably, the handhold element has gills on the outer surface. The gills facilitate swiveling of the handhold elements 4.1 and 4.2 for the user. Preferably, the gills display the position of the first mixing chamber. If the gills are coaxially arranged to the longitudinal axis of the capsule housing, the first mixing 5a is coaxially arranged to the longitudinal axis of the capsule housing also. The second position, i.e. mixing and/or discharge position, is shown. If the gills are perpendicularly orientated to the longitudinal central axis of the capsule housing, the first position, i.e. transport and/or storage position, is displayed.

Figures 7A, 7B, 7C, 7D:
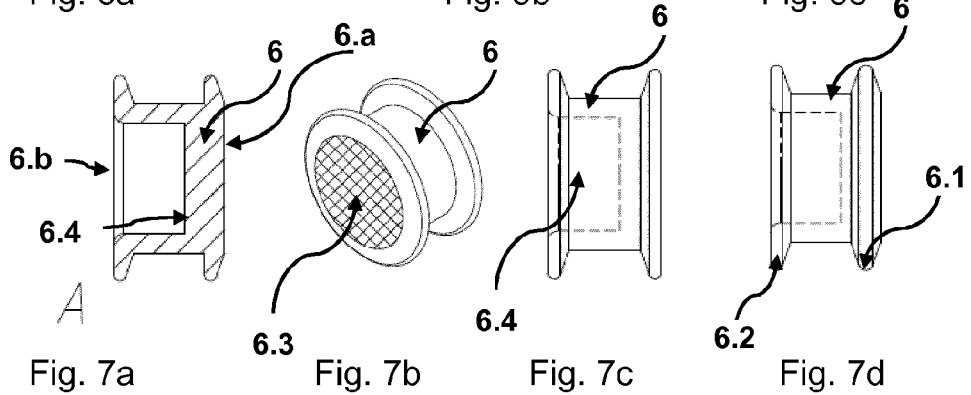

In FIGS. 7a, 7b, 7c and 7d, the sealing piston 6 is shown, wherein FIGS. 7a and 7c show the recess 6.4 on the side 6b averting the mixing chamber. FIG. 7b show the surface roughness 6.3 of the sealing piston on the side 6a facing the first mixing chamber 5a. The single- or double-phase lamellae 6.1 and 6.2 are shown in FIG. 7d. In FIGS. 8a, 8b and 9, the squeezing piston 8, preferably being manufactured from PC (polycarbonate), with its front 8.1, central 8.2 and back region 8.3 is shown, wherein knobs being on the inside of the guiding adapter 7 are shown in top view in FIG. 8b. FIG. 9 shows a means 7.1 for fixing the guiding adapter, such as a bayonet catch 7.1, at the housing of the mixing capsule 2. In FIGS. 10a and 10b, the reference means 9 are shown, which may be a partial wall or nose(s) protruding inwardly and being directed in the direction of the mixing chamber.

REFERENCE SIGNS 1 mixing capsule
2 capsule housing; 2.1 front end; 2.2 central region, 2.3 back end of the capsule housing 2, 2.4 sealing means, such as bayonet lock
3 discharge nozzle, 3.1 discharge opening; 3.2, 3.3 inside the outlet; 3.2 front region,
3.3 back region in inner discharge nozzle 3
4.1, 4.2 lower rotatably mounted handhold element 4.1, and upper handhold element
4.2 rotatably mounted in the housing
5a rotatably mounted first mixing chamber; 5b second mixing chamber; 5a+5b entire mixing chamber; 5.1 pipe section, in particular cylindrical sleeve or cylindrical one side closed sleeve 5.1
6 sealing piston, 6a side facing the mixing chamber 5a, 6b side averting the mixing chamber
6.1 lamella at the side 6a facing the mixing chamber, 6.2 lamella at the side 6b averting the mixing chamber 5,
6.3 surface roughness 6.3 sealing piston
6.4 recess at the side 6b averting the mixing chamber
7 guiding adapter, 7.1 means for fixing, such as bayonet catch 8 squeezing piston, 8.1 front region 8.1 of the squeezing piston 8, 8.2 central region,
8.3 back region of the squeezing piston 8, 8.4 locking means, such as elevation/ridge
9 resistance means, partially wall or nose(s) or spigots/tappet, respectively
D1, D2 diameter D1 of the sealing piston, substantially is reducible to diameter D2
Y rotational axis of the handhold elements (4.1, 4.2) and/or of mixing chamber 5a
Z longitudinal axis of the capsule, Z1 longitudinal axis pipe section
A pasty or kneadable, respectively, dental composition (component A)
B pasty or kneadable, respectively, dental composition (component B)
C mixed pasty or kneadable, respectively, dental composition (mixture of components A and B)

The invention claimed is:

1. Two-component mixing capsule (1) for intake and for mixing of two compositions comprising a capsule housing (2) having a discharge opening (3.1) at its front end (2.1), wherein
the mixing capsule (1) comprises a lower handhold element (4.1) rotatably mounted in the capsule housing and an upper handhold element (4.2) rotatably mounted in the capsule housing, wherein the rotational axis (Y) of the handhold elements (4.1, 4.2) is approximately perpendicularly arranged to the longitudinal axis (Z) of the mixing capsule (1), and wherein a rotatably mounted first mixing chamber (5a) is assigned to at least one of the two handhold elements, and a second mixing chamber (5b) is arranged in the capsule housing (2), and, in the capsule housing (2), a sealing piston (6) is arranged at the back end (2.3), wherein the sealing piston (6) is passable through the rotatably mounted first mixing chamber (5a) and the second mixing chamber (5b) along the longitudinal axis (Z) of the mixing capsule in use, when the rotatably mounted first mixing chamber (5a) is coaxially oriented to the longitudinal axis (Z) of the mixing capsule (1).

2. Mixing capsule according to claim 1, wherein the two rotatably mounted handhold elements (4.1, 4.2) are connected with each other.

3. Mixing capsule according to claim 1, wherein, the rotatably mounted first mixing chamber (5a) is arranged at the lower handhold element (4.1) rotatably mounted in the capsule housing (2) and at the upper handhold element (4.2) rotatably mounted in the capsule housing (2).

4. Mixing capsule according to claim 3, wherein a pipe section (5.1) connected to one rotatably mounted handhold element (4.1, 4.2) or a cylindrical one side closed sleeve (5.1) forms the rotatably mounted first mixing chamber (5a) and the second mixing chamber (5b) is located in the front region (2.1) in the capsule housing (2).

5. Mixing capsule according to claim 3, wherein one rotatably mounted handhold element and the first mixing chamber (5a) form a one-piece component.

6. Mixing capsule according to claim 1, wherein a pipe section (5.1) connected to the rotatably mounted handhold element (4.1, 4.2) forms the rotatably mounted first mixing chamber (5a) and the second mixing chamber (5b) is located in the front region (2.1) in the capsule housing (2), wherein the mixing capsule is in a first position if the longitudinal axis (Z1) of the pipe section (5.1) is twisted by approximately 90° to the longitudinal axis (Z) of the capsule housing (2) such that the rotatably mounted first mixing chamber (5a), and the second mixing chamber (5b) are separated from each other.

7. Mixing capsule according to claim 1, wherein the movable sealing piston (6) is reducible in its diameter.

8. Mixing capsule according to claim 1, wherein a guiding adapter (7), in which a movable squeezing piston (8) is arranged, is attachable to the back end (2.3) of the housing (2) of the mixing capsule (1), wherein the movable squeezing (8) piston displaces and/or pushes the sealing piston (6) through the first mixing chamber (5a).

9. Mixing capsule according to claim 1, wherein the sealing piston (6) a) has at least in part a defined surface roughness (6.3) on the side (6a) facing the mixing chamber (5a, 5b, 5a+5b) and/or b) has a recess (6.4) for receiving the front region (8.1) of a squeezing piston (8) on the side (6b) averting the mixing chamber (5a, 5b, 5a+5b).

10. Mixing capsule according to claim 1, wherein
a) the discharge opening (3.1) is arranged at a discharge nozzle (3), and the discharge nozzle is an integral part of the capsule housing (2), or
b) the discharge opening (3.1) is a discharge nozzle (3) and is fixable at the capsule housing (2).

11. Mixing capsule according to claim 10, wherein at least one resistance means (9) is provided inside the discharge nozzle (3) in the front or back region (3.2, 3.3) in front of the discharge opening (3.1).

12. Method for mixing at least two compositions A and B into a composition C in the mixing capsule according to claim 1, comprising the steps of
(i) transferring the mixing capsule from a a) first position into a b) second position by the pipe section (5.1) being rotated in the direction towards the longitudinal axis (Z) of the capsule housing (2), by rotating at least one handhold element (4.1, 4.2) with the pipe section (5.1) in which the mixing chamber (5a) and composition B is located about its rotational axis (Y), such that the first mixing chamber (5a) comprising composition B and the second mixing chamber (5b) in the capsule housing (2) comprising composition A form a common mixing chamber (5a+5b),
(ii) mixing compositions A and B with each other, by the mixing capsule (1) being moved, and
(iii) obtaining composition C.

13. Method according to claim 12, wherein
(iv) discharging of composition C from the mixing capsule is made, with the steps of
(iv.1) fixing the guiding adapter (7) with movable squeezing piston (8) at the back end (2.3) of the capsule housing (2),
(iv.2) pushing the squeezing piston (8) into the capsule housing (2) of the mixing capsule (1) along with the sealing piston (6) such that the sealing piston (6) is pushed through the common mixing chamber (5a+5b) by the squeezing piston (8).

14. Method according to claim 12, wherein
the mixing capsule a) is in a first position if the longitudinal axis (Z1) of the pipe section (5.1) is twisted by approximately 90° to the longitudinal axis (Z) of the capsule housing (2) such that the first mixing chamber (5a) comprising composition B, and the second mixing chamber (5b) comprising composition A, are separated from each other, or wherein the mixing capsule
b) is in a second position if the longitudinal axis (Z1) of the pipe section (5.1) is coaxial to the longitudinal axis (Z) of the capsule housing (2) such that the first mixing chamber (5a) and the second mixing chamber (5b)

form a common mixing chamber (5a+5b) comprising compositions (A and B), or wherein the mixing chamber in position b) is also in a discharge position c) if the guiding adapter (7) with movable squeezing piston (8) is arranged at the back end (2.3) of the capsule housing (2), wherein the movable squeezing piston (8) and the sealing piston (6) are displaceable through the common mixing chamber (5a+5b) in the direction towards the discharge opening (3.1).

15. A method of using a mixing capsule according to claim 1 for storing, mixing and applying of pasty to kneadable dental two-component compositions.

* * * * *